US012341311B2

(12) United States Patent
Hirooka et al.

(10) Patent No.: US 12,341,311 B2
(45) Date of Patent: Jun. 24, 2025

(54) TERMINAL BLOCK

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Toshiya Hirooka, Yokkaichi (JP); Daisuke Hashimoto, Yokkaichi (JP); Jisung Kim, Yokkaichi (JP); Sunghyun Byun, Yokkaichi (JP); Kan Murai, Yokkaichi (JP); Yasuhiro Kudo, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 472 days.

(21) Appl. No.: 17/786,020

(22) PCT Filed: Dec. 24, 2020

(86) PCT No.: PCT/JP2020/048329
§ 371 (c)(1),
(2) Date: Apr. 20, 2023

(87) PCT Pub. No.: WO2021/140924
PCT Pub. Date: Jul. 15, 2021

(65) Prior Publication Data

US 2023/0275369 A1 Aug. 31, 2023

(30) Foreign Application Priority Data

Jan. 7, 2020 (JP) ................................ 2020-000832

(51) Int. Cl.
*H01R 9/24* (2006.01)
*H01R 13/52* (2006.01)

(52) U.S. Cl.
CPC ........... *H01R 9/24* (2013.01); *H01R 13/5202* (2013.01); *H01R 13/5216* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 8,167,634 | B2 * | 5/2012 | Fujiwara | H01R 13/5202 439/271 |
| 10,224,666 | B2 * | 3/2019 | Aoshima | H01R 13/648 |

(Continued)

FOREIGN PATENT DOCUMENTS

| | | |
|---|---|---|
| JP | 2011-160619 A | 8/2011 |
| JP | 2014-053148 A | 3/2014 |
| JP | 2019-179617 A | 10/2019 |

OTHER PUBLICATIONS

Mar. 16, 2021 Search Report issued in International Patent Application No. PCT/JP2020/048329.

*Primary Examiner* — Tho D Ta
(74) *Attorney, Agent, or Firm* — Oliff PLC

(57) ABSTRACT

A terminal block that is to be provided on a housing of a device that is to be mounted on a vehicle, the terminal block including: a seating that is to be fixed to the housing so as to close an opening of the housing; a tubular fitting that is formed on a front surface of the seating and is to be fitted to a mating connector; and a ring-shaped seal that is provided on a back surface of the seating.

6 Claims, 4 Drawing Sheets

(56) References Cited

U.S. PATENT DOCUMENTS

| | | | |
|---|---|---|---|
| 12,119,606 B2 * | 10/2024 | Hirooka ............... | H01R 13/748 |
| 2019/0305446 A1 | 10/2019 | Kawamura et al. | |

* cited by examiner

TERMINAL BLOCK

BACKGROUND

The present disclosure relates to a terminal block.

Conventionally, for example, the terminal block described in JP 2011-160619A, which is a terminal block to be attached to a device, includes a seating that is fixed to the housing of the device so as to close an opening of the housing, and a ring-shaped sealing member that is provided on the back surface of the seating. The sealing member is provided in a compressed state between the seating and the housing of the device. This sealing member seals the space between the seating and the housing of the device, and prevents water from entering the opening of the housing. Also, the seating has a plurality of reinforcement ribs standing on the front surface opposite to the surface on which the seal member is provided, and the ribs improve the rigidity of the seating. As a result, it is possible to secure rigidity with which the seating can withstand a reaction force applied by the sealing member.

SUMMARY

In the terminal block described above, a recessed portion is formed in the front surface of the seating as a space surrounded by the reinforcement ribs.

Therefore, when water splashes on the terminal block, the water may pool in the recessed portion.

An exemplary aspect of the disclosure provides a terminal block capable of preventing water from pooling in the recessed portion formed by the ribs of the seating.

A terminal block according to the present disclosure is a terminal block that is to be provided on a housing of a device that is to be mounted on a vehicle, the terminal block including: a seating that is to be fixed to the housing so as to close an opening of the housing; and a ring-shaped seal that is provided on a back surface of the seating, wherein, in a state where the terminal block is attached to the housing, the seal is compressed by being sandwiched between the housing and the seating at a position where the seal surrounds the opening, the seating is provided with ribs that stand on a front surface side that is opposite to a side on which the seal is provided, and one or more recesses that are spaces surrounded by the ribs, and the recesses are provided with drainage holes that are located outside the seal.

With the present disclosure, it is possible to provide a terminal block capable of preventing water from pooling in the recesses formed by the ribs of the seating.

DETAILED DESCRIPTION OF EMBODIMENTS

Description of Embodiment of Present Disclosure

Figure 1:
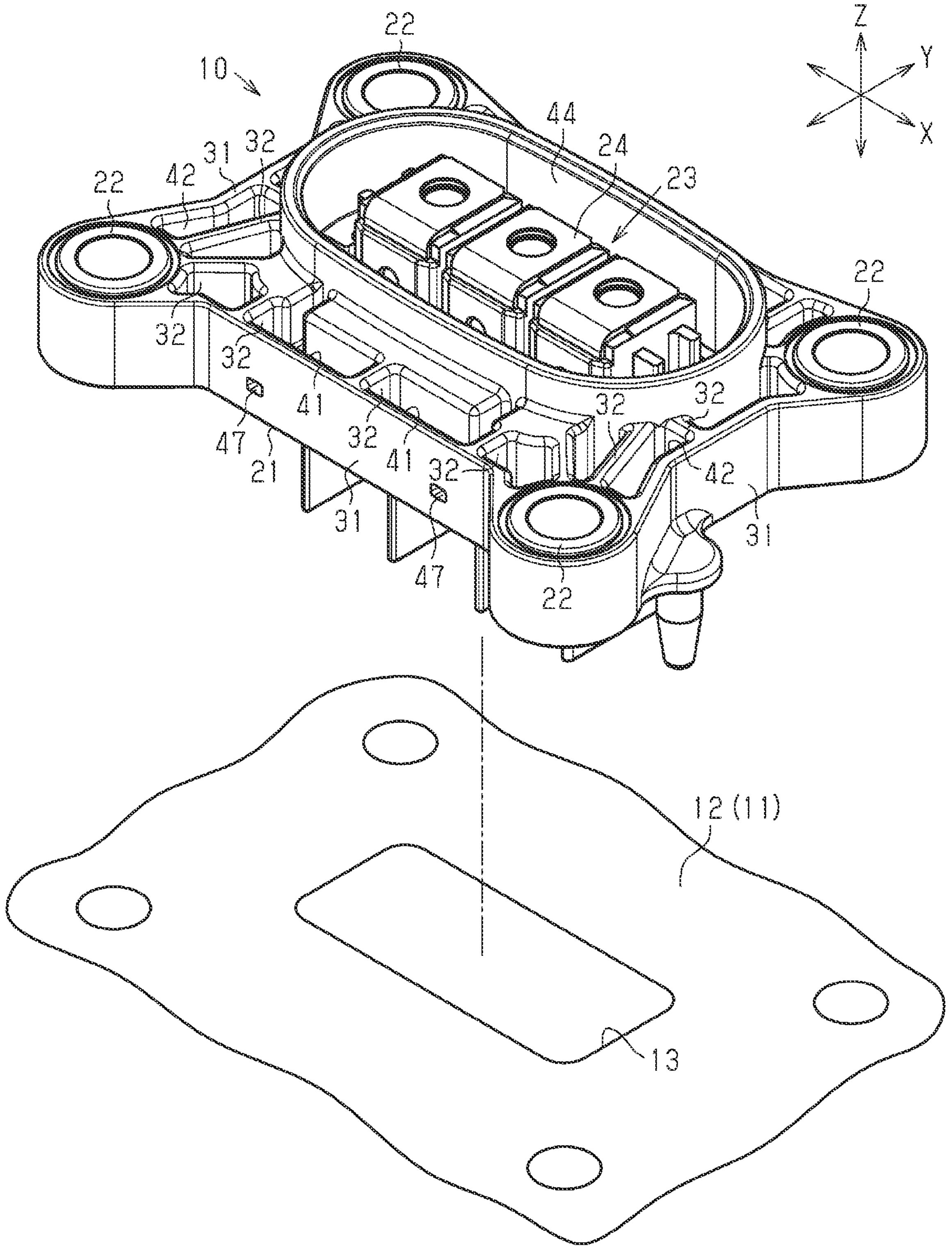
FIG. 1 is a perspective view of a terminal block according to an embodiment.

First, aspects of the present disclosure will be listed and described.

A terminal block according to the present disclosure is as follows.

[1] A terminal block that is to be provided on a housing of a device that is to be mounted on a vehicle, the terminal block including: a seating that is to be fixed to the housing so as to close an opening of the housing; and a ring-shaped sealing member that is provided on a back surface of the seating, wherein, in a state where the terminal block is attached to the housing, the sealing member is compressed by being sandwiched between the housing and the seating at a position where the sealing member surrounds the opening, the seating is provided with ribs that stand on a front surface side that is opposite to a side on which the sealing member is provided, and one or more recessed portions that are spaces surrounded by the ribs, and the recessed portions are provided with drainage holes that are located outside the sealing member.

With this configuration, it is possible to discharge water that has entered the recessed portions of the seating, to the outside of the recessed portions through the drainage holes. Thus, it is possible to prevent water from pooling in the recessed portions. In addition, the drainage holes are provided outside the sealing member, and therefore, the water in the recessed portions is discharged to the outside of the sealing region of the sealing member through the drainage holes. Thus, the water discharged from the drainage holes is prevented from flowing into the sealing member, i.e., toward the opening of the housing of the device.

[2] It is preferable that the ribs include outer peripheral ribs that constitute an outer periphery of the seating, and the drainage holes are formed in the outer peripheral ribs. With this configuration, it is possible to discharge the water in the recessed portions partially constituted by the outer peripheral ribs, to the outside of the outer peripheral ribs of the seating through the drainage holes.

[3] It is preferable that bottom walls of the recessed portions for which the outer peripheral ribs have the drainage holes overlap the sealing member. That is to say, if the bottom walls of the recessed portions overlap the sealing member, it is possible to more reliably discharge water to the outside of the sealing member by providing the drainage holes in the outer peripheral ribs.

[4] It is preferable that the recessed portions include first recessed portions that have bottom walls that overlap the sealing member and have the drainage holes in the outer peripheral ribs, and second recessed portions that have bottom walls outside the sealing member, and the drainage holes of the second recessed portions are formed in the bottom walls of the second recessed portions.

With this configuration, the second recessed portions that have bottom walls outside the sealing member have drainage holes in the bottom walls. Therefore, it is easier to form drainage holes in the second recessed portions.

[5] It is preferable that the seating is formed of a synthetic resin material. Synthetic resin materials have a relatively low rigidity. Therefore, if the seating is formed of a synthetic resin material, it is necessary to provide the seating with reinforcement ribs (i.e., recessed portions) to secure rigidity with which the seating can withstand a reaction force applied by the sealing member. Therefore, in order to solve the problem of water retention in the recessed portions resulting from providing the ribs, it is more important to form the drainage holes in the recessed portions.

[6] It is preferable that the one or more recessed portions are provided as a plurality of recessed portions, and the drainage holes are provided in the plurality of recessed portions. With this configuration, it is possible to prevent water from pooling in the plurality of recessed portions, using the drainage holes.

Details of Embodiment of Present Disclosure

Specific examples of a terminal block according to the present disclosure will be described below with reference to the drawings. It should be noted that the present disclosure is not limited to these examples, and is indicated by the scope of claims, and is intended to include all modifications within the meaning and scope equivalent to the scope of claims. It should be noted that the term "parallel" in the present disclosure does not mean parallel in a strict sense, but has a broader range of meaning, and the effect of the present disclosure can be achieved if objects are considered to be parallel within this range. Similarly, the term "orthogonal" in the present disclosure does not mean orthogonal in a strict sense, but has a broader range of meaning, and the effect of the present disclosure can be achieved if objects are considered to be orthogonal within this range.

As shown in FIG. 1, a terminal block 10 according to the present embodiment is to be attached to a housing 11 of a device that is to be mounted on a vehicle. Note that, in the drawings, the X axis of the X, Y, and Z axes orthogonal to each other represents a longitudinal direction X of the terminal block 10, the Y-axis represents a width direction Y of the terminal block 10, and the Z-axis represents a height direction Z of the terminal block 10.

The terminal block 10 includes a seating 21 that is to be fixed to an attachment surface 12 of the housing 11. The attachment surface 12 of the housing 11 according to the present embodiment has a flat shape. In addition, the attachment surface 12 according to the present embodiment is configured to face upward and intersect with the direction of gravity. The attachment surface 12 is provided with an opening 13 that brings the inside and the outside of the housing 11 into communication with each other. The seating 21 is to be fixed to the attachment surface 12 so as to close the opening 13 of the housing 11. Also, the terminal block 10 is to be attached to the attachment surface 12 so that the height direction Z is orthogonal to the attachment surface 12. The seating 21 according to the present embodiment is, for example, an injection molded product made of a synthetic resin material.

Seating 21

Figure 2:
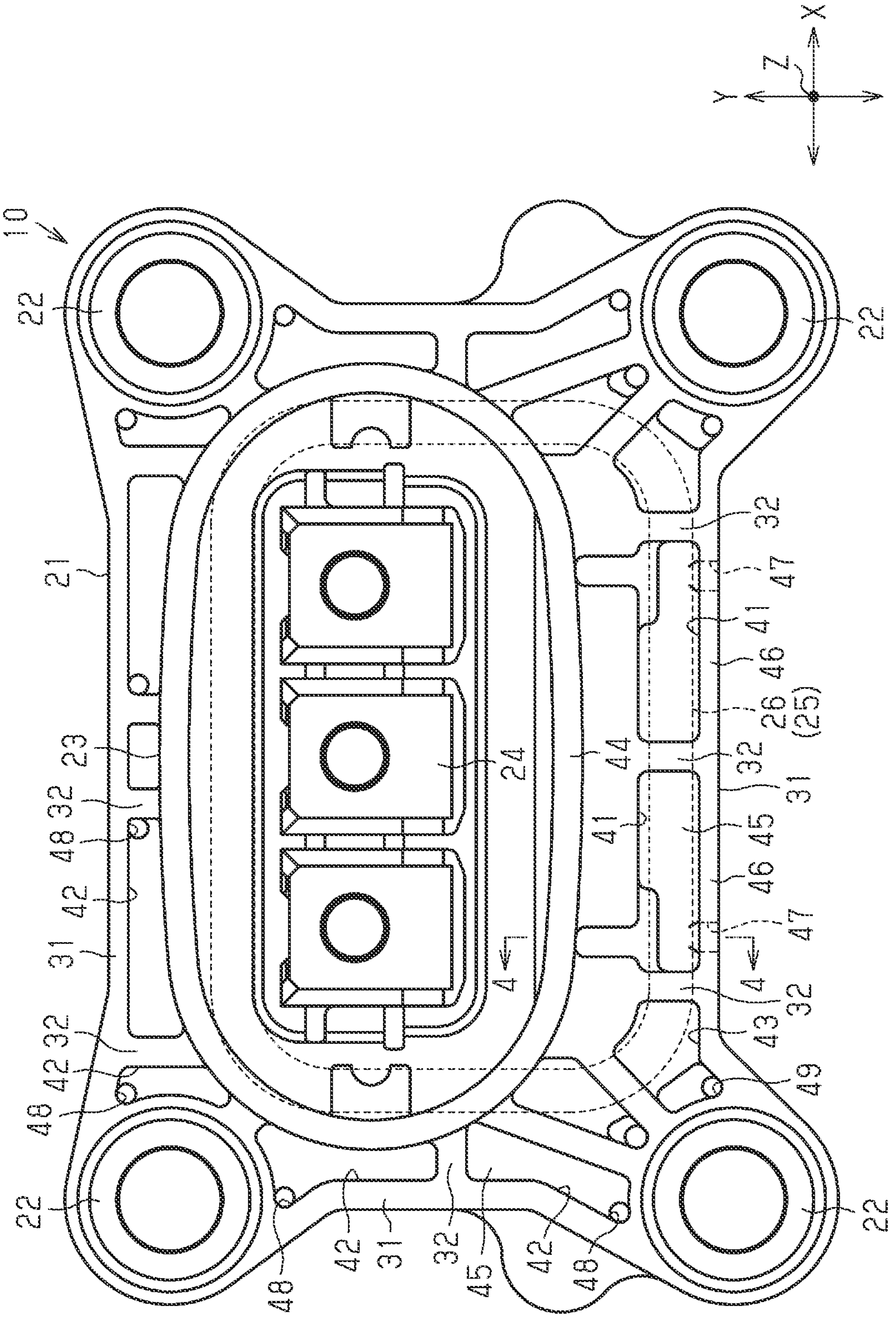
FIG. 2 is a plan view of the terminal block according to the embodiment.

As shown in FIGS. 1 and 2, the seating 21 has a substantially rectangular shape in a plan view (a view in a direction orthogonal to the attachment surface 12, which is a view in the height direction Z in the present embodiment). In the following description, a view in the height direction Z of the terminal block 10 is simply referred to as a "plan view". Also, in the following description, the side of the seating 21 that faces the housing 11 is referred to as a "back surface side" and the opposite side is referred to as a "front surface side".

Collars 22 that each have a tubular shape are respectively embedded in the four corners of the seating 21 in a plan view, through insert molding. Each collar 22 is made of a material (for example, a metal material) that is more rigid than the synthetic resin material used to form the seating 21. Each collar 22 is fastened and fixed to the attachment surface 12 using bolts (not shown). Thus, the seating 21 is fixed to the attachment surface 12. Note that the central axis of each collar 22 (i.e., the bolt attaching direction) in the present embodiment is parallel to the height direction Z of the terminal block 10.

The seating 21 is provided with a connector 23 in a central portion thereof in a plan view. The connector 23 is provided with a plurality of terminals 24 that are arranged so as to penetrate through the seating 21 from the front surface side to the back surface side. The plurality of terminals 24 are arranged one after another in the longitudinal direction X of the terminal block 10. One end of each terminal 24 (the end on the back surface side of the seating 21) is inserted into the housing 11 through the opening 13, and is connected to a terminal of a device (not shown) provided in the housing 11. Also, the other end of each terminal 24 (the end on the front surface side of the seating 21) is connected to a terminal of a mating connector (not shown) that is to be attached to the connector 23 from the side opposite to the device.

Sealing Member 25

Figure 3:
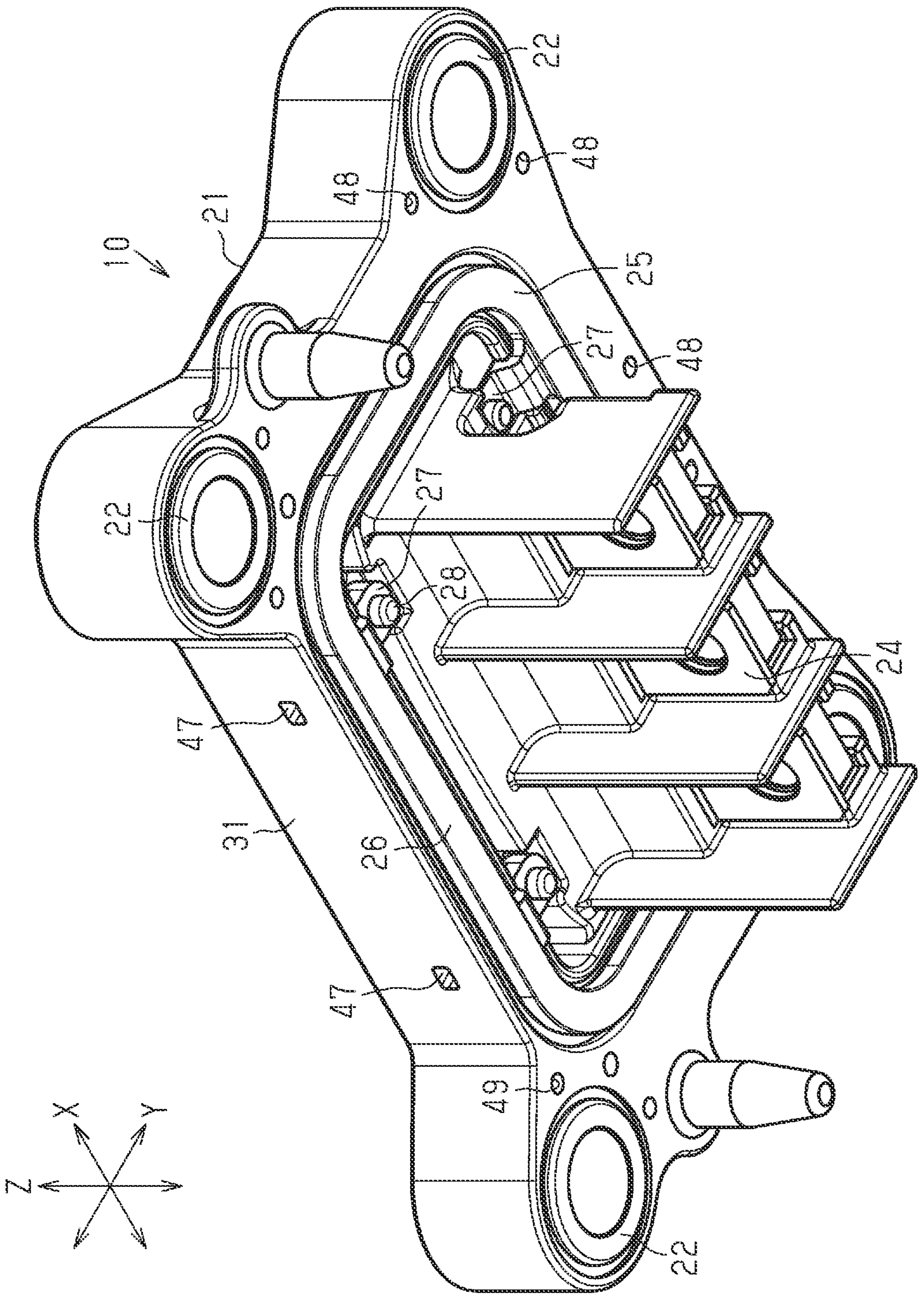
FIG. 3 is a perspective view of the terminal block according to the embodiment seen from the back surface side.
Figure 4:
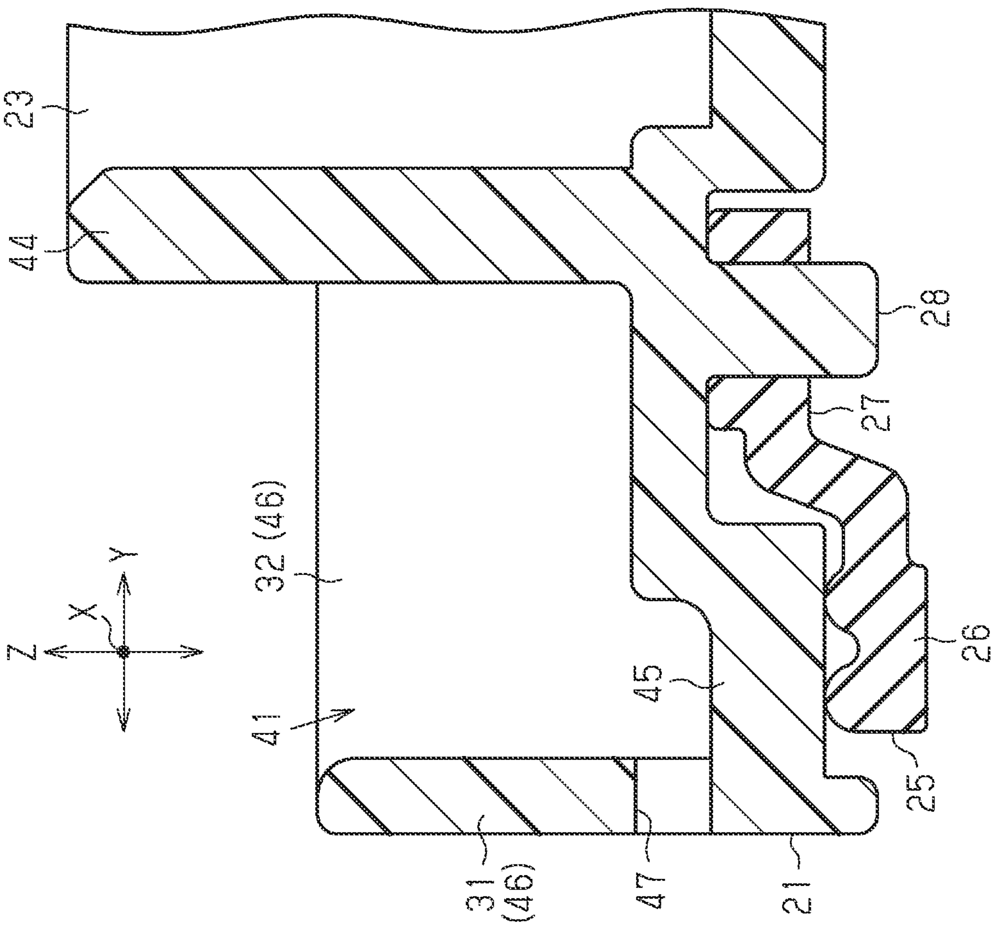
FIG. 4 is a cross-sectional view taken along a 4-4 line shown in FIG. 2.

As shown in FIGS. 3 and 4, the terminal block 10 is provided with a sealing member 25 (seal) on the back surface of the seating 21. The sealing member 25 is made of an elastic material such as rubber or elastomer. The sealing member 25 includes a sealing main body 26 that has a ring shape in a plan view, and a plurality of fixed portions 27 that each extend from the sealing main body 26 toward the inner periphery. Each fixed portion 27 is fixed to a fixing pin 28 that extends in the height direction Z on the back surface of the seating 21.

The sealing main body 26 is larger in size than the opening 13 so as to be able to surround the opening 13 of the housing 11 in a plan view. When the seating 21 is fixed to the housing 11, the sealing main body 26 is sandwiched between the attachment surface 12 of the housing 11 and the seating 21 in a compressed state at a position where the sealing main body 26 surrounds the opening 13. As a result, the gap between the seating 21 and the attachment surface 12 is sealed, and water is prevented from entering the opening 13.

Ribs 31 and 32

As shown in FIGS. 1 and 2, the seating 21 has a plurality of reinforcement ribs 31 and 32 that stand on the front surface thereof and a plurality of recessed portions 41, 42, and 43 (recesses) formed by the plurality of ribs 31 and 32. Also, a fitting portion 44 that has a tubular shape and constitutes the connector 23 is formed on the front surface of the seating 21. The fitting portion 44 is a portion into which the mating connector is to be fitted. The plurality of ribs 31 and 32 and the plurality of recessed portions 41 to 43 are formed around the fitting portion 44.

The plurality of ribs 31 and 32 stand so as to extend toward the front surface side in the height direction Z. The plurality of ribs 31 and 32 include outer peripheral ribs 31 that constitute the outer periphery of the seating 21 in a plan view, and intermediate ribs 32 that are formed between the outer peripheral ribs 31 and the fitting portion 44. The outer peripheral ribs 31 are located outside the sealing main body 26 in a plan view (see FIG. 2).

The plurality of recessed portions 41 to 43, which are spaces surrounded by the ribs 31 and 32 of different types, each have a bottom wall 45 and a side wall 46 that extends from the bottom wall 45 toward the front surface side in the height direction Z, and the opposite side (the front surface side) of the bottom wall 45 of each of the recessed portions 41 to 43 is open. That is to say, the side wall 46 of each of the recessed portions 41 to 43 has a ring shape that constitutes a closed loop in a plan view. Note that the side walls 46 of the recessed portions 41 to 43 according to the present embodiment are constituted by combinations of the side portions of the outer peripheral ribs 31, the intermediate ribs 32, and the fitting portion 44.

The plurality of recessed portions 41 to 43 include a plurality of first recessed portions 41, a plurality of second recessed portions 42, and a plurality of third recessed portions 43.

As shown in FIGS. 2 and 4, the bottom walls 45 of the first recessed portions 41 overlap the sealing main body 26 in a plan view. A portion of the side wall 46 of each first recessed portion 41 is constituted by an outer peripheral rib 31. The outer peripheral ribs 31 that serve as the side walls 46 of the first recessed portions 41 are respectively provided with drainage holes 47 that bring the inside of the first recesses 41 and the outside of the terminal block 10 into communication with each other. The drainage holes 47 are formed outside the sealing main body 26 in a plan view. Also, the outer peripheral ribs 31 in which the drainage holes 47 according to the present embodiment are formed extend in the longitudinal direction X of the terminal block 10, and the drainage holes 47 extend through the outer peripheral ribs 31 in the width direction Y of the terminal block 10. Also, the positions of the drainage holes 47 in the height direction Z are set so that portions of the inner surfaces of the drainage holes 47 are substantially at the same positions as the upper surfaces of the bottom walls 45.

As shown in FIG. 2, the bottom walls 45 of the second recessed portions 42 are located outside the sealing main body 26 in a plan view. The bottom walls 45 of the second recessed portions 42 are respectively provided with drainage holes 48 that extend through the bottom walls 45 in the height direction Z. That is to say, the drainage holes 48 are formed outside the sealing main body 26 in a plan view so that the inside of the second recessed portions 42 and the outside of the terminal block 10 are in communication with each other.

Also, the bottom walls 45 of the third recessed portions 43 partially overlap the sealing main body 26 in a plan view, and are partially located outside the sealing main body 26 in a plan view. Portions of the bottom walls 45 of the third recessed portions 43 located outside the sealing main body 26 are respectively provided with drainage holes 49 that extend through the bottom walls 45 in the height direction Z. That is to say, the drainage holes 49 are formed outside the sealing main body 26 in a plan view so that the inside of the third recessed portions 43 and the outside of the terminal block 10 are in communication with each other. Note that, as with the first recessed portions 41, the third recessed portions 43 are recessed portions whose bottom walls 45 overlap the sealing main body 26 in a plan view. However, the third recessed portions 43 are different from the first recessed portions 41 in that the bottom walls 45 thereof have regions outside the sealing main body 26, in which the drainage holes 49 can be formed.

The actions of the present embodiment will be described.

The reinforcement ribs 31 and 32 stand on the seating 21 so as to extend in the height direction Z. Therefore, when each collar 22 is fastened and fixed to the attachment surface 12, the portions between the collars 22 of the seating 21 are prevented from warping so as to protrude toward the front surface when subjected to the reaction force from the seal main body 26. In particular, in the present embodiment, the seating 21 is made of a synthetic resin material with relatively low rigidity, and therefore it is more important to improve the rigidity of the seating 21 using the ribs 31 and 32.

As a result of providing the ribs 31 and 32, the recessed portions 41 to 43 are formed in the front surface of the seating 21. Here, for example, when the device to which the terminal block 10 is attached is provided in a vehicle at a position that may get wet with water, water may enter the recessed portions 41 to 43, but water that has entered the recessed portions 41 to 43 is discharged to the outside of the recessed portions 41 to 43 through the drainage holes 47 to 49 formed in the recessed portions 41 to 43.

The effects of the present embodiment will be described.

(1) The drainage holes 47 to 49 are formed in the recessed portions 41 to 43 formed in the front surface side of the seating 21, at positions outside the sealing member 25. With this configuration, it is possible to discharge water that has entered the recessed portions 41 to 43 of the seating 21, to the outside of the recessed portions 41 to 43 through the drainage holes 47 to 49. Thus, it is possible to prevent water from pooling in the recessed portions 41 to 43.

Also, the drainage holes 47 to 49 in the recessed portions 41 to 43 are located outside the sealing member 25, and therefore the water in the recessed portions 41 to 43 is discharged to the outside of the sealing region (the sealing main body 26) of the sealing member 25 through the drainage holes 47 to 49. Thus, the water discharged from the drainage holes 47 to 49 is prevented from flowing into the sealing main body 26, i.e., toward the opening 13 of the housing 11 of the device.

(2) The plurality of ribs formed on the seating 21 include the outer peripheral ribs 31 that constitute the outer periphery of the seating 21, and the drainage holes 47 of the first recessed portions 41 whose side walls 46 are partially constituted by the outer peripheral ribs 31 are formed in the outer peripheral ribs 31. With this configuration, it is possible to discharge the water in the first recessed portions 41 to the outside of the outer peripheral ribs 31 of the seating 21 through the drainage holes 47.

(3) The bottom wall 45 of the first recessed portions 41 whose outer peripheral ribs 31 are provided with the drainage holes 47 overlap the sealing member 25 in a plan view. That is to say, if the recessed portions of the seating 21 overlap the sealing member 25 in a plan view, it is possible to more reliably discharge water to the outside of the sealing member 25 by providing the drainage holes 47 in the outer peripheral ribs 31.

(4) The plurality of recessed portions formed in the seating 21 include the second recessed portions 42 that respectively have the bottom walls 45 that are located outside the sealing member 25 in a plan view, and the drainage holes 48 in the second recessed portions 42 are formed in the bottom walls 45 of the second recessed portions 42. Therefore, it is possible to match the direction in which the drainage holes 48 extend with the direction in which the ribs 31 and 32 stand (the height direction Z in the present embodiment, which is a punch-out direction), and the drainage holes 48 can be easily formed in the second recessed portions 42.

(5) If the seating 21 is made of a synthetic resin material, the seating 21 is provided with the reinforcement ribs 31 and 32 (i.e., the recessed portions 41 to 43) in order to ensure rigidity with which the seating 21 can withstand the reaction force applied by the sealing member 25. Therefore, in order to solve the problem of water pooling in the recessed portions 41 to 43 resulting from providing the ribs 31 and 32, it is more important to form the drainage holes 47 to 49 in the recessed portions 41 to 43.

The present embodiment may be modified and implemented as follows. The present embodiment and the following modified examples can be implemented in combination with each other as long as no technical contradiction arises.

In the second recessed portions 42, the drainage holes 48 may be formed in the outer peripheral ribs 31 that constitute portions of the side walls 46 of the second recessed portions 42. Similarly, in the third recessed portions 43, the drainage holes 49 may be formed in the outer peripheral ribs 31 that constitute portions of the side walls 46 of the third recessed portions 43.

The shapes of the ribs 31 and 32 and the shapes of the recessed portions 41 to 43 in the seating 21 are not limited to those in the above embodiment, and may be appropriately changed according to the size, shape, rigidity of the material, and so on, of the seating 21 and the connector 23. In addition, the shape of the sealing main body 26 and so on of the sealing member 25 is not limited to that in the above embodiment, and may be appropriately changed according to the sizes of the seating 21 and the connector 23. That is to say, the present disclosure is applicable to a configuration of the seating 21 different from the above embodiment, such as a configuration in which the first recessed portions 41 that overlap the sealing member 25 are not present in a plan view, or a configuration in which the second recessed portions 42 that do not overlap the sealing member 25 are not present in a plan view.

Drainage holes may be formed in all of the plurality of recessed portions 41 to 43 formed in the seating 21. With this configuration, it is possible to prevent water from pooling in the plurality of recessed portions 41 to 43, using the drainage holes.

The material of the seat 21 is not limited to a synthetic resin material, and may be a metal material such as aluminum.

The external shape of the seating 21 in a plan view is not limited to that in the above embodiment, and may be, for example, a substantially square shape, i.e., a shape in which the length in the longitudinal direction X and the length in the width direction Y are substantially equal to each other.

The fitting portion 44 of the terminal block 10 according to the embodiment may be referred to as a hood that has a terminal housing chamber that may be tubular and houses the plurality of terminals 24. The seating 21 of the terminal block 10 according to the embodiment may be referred to as a flange that is integrated with the tubular fitting portion 44 (tubular fitting) and extends in a predetermined direction in a plane that may be an XY plane. The tubular fitting portion 44 and the seating 21 according to the embodiment may be made of the same synthetic resin. As shown in FIG. 3, the sealing member 25 according to the embodiment may be attached to the lower surface or the base surface of the seating 21 configured to face the attachment surface 12 when the terminal block 10 is fastened to the attachment surface 12. The seating 21 may have an upper surface opposite to the lower surface of the seating 21 to which the sealing member 25 is attached. Each of the recessed portions 41, 42, and 43 of the seating 21 according to the embodiment may have a first opening that is open in the upper surface of the seating 21. Each of the recessed portions 41, 42, and 43 may have a second opening or a capillary opening that has a smaller opening area than the first opening, in one or both of the outermost surface of the seating 21 in a radial direction and the lower surface of the seating 21. The drainage holes 47, 48, and 49 according to the embodiment are representative examples of the second openings or capillary openings in the recessed portions 41, 42, and 43 configured to facilitate the drainage of water from the recessed portions 41, 42, and 43.

The present disclosure includes the following aspects. Reference numerals are given to some of the components of the exemplary embodiments, not for limitation, but for facilitating understanding. Some of the matters described in the following aspects may be omitted, or some of the matters described in the aspects may be selected or extracted and combined.

[Supplementary Note 1] One aspect of the present disclosure is directed to a terminal block (10) that is to be used with a vehicle device housing (11) that includes a terminal block attachment surface (12) that has an opening (13), and the terminal block (10) may include:

- a tubular hood (44) that has a terminal housing;
- a plurality of conductive terminals (24) that are housed in the terminal housing;
- a flange (21) that is configured so that the terminal block (10) can be retrofit to the terminal block attachment surface (12) of the vehicle device housing (11), and has an upper surface, a lower surface, and an outermost surface in a radial direction; and
- a plurality of recessed portions (41, 42, 43) provided on the flange (21)
- wherein each of the plurality of recessed portions (41, 42, 43) may have a first opening that is provided in the upper surface of the flange (21), and
- the plurality of recessed portions (41, 42, 43) may have second openings (47, 48, 49) that are smaller than the first opening, in one or both of the outermost surface in the radial direction and the lower surface of the flange (21), and the second openings (47, 48, 49) may be configured to configured to facilitate the drainage of water from the recessed portions (41, 42, 43).

[Supplementary Note 2] In one aspect of the present disclosure, the lower surface (32) of the flange (21) may be configured to face the terminal block attachment surface (12) when the terminal block (10) is fastened to the terminal block attachment surface (12).

[Supplementary Note 3] In one aspect of the present disclosure, the terminal block (10) may be provided with a ring-shaped elastic seal (44) on the lower surface (32) of the flange (21), and

- the second openings (47, 48, 49) of the plurality of recessed portions may be open in the lower surface (32) of the flange (21) at positions outside an outer periphery of the ring-shaped elastic seal (44).

[Supplementary Note 4] In one aspect of the present disclosure, the terminal block (10) may further include

- a plurality of tubular collars (22) that are configured to be engaged with a plurality of fastening elements for fastening the terminal block (10) to the terminal block attachment surface (12) of the vehicle device housing (11), and are embedded in the flange (21).

The invention claimed is:

1. A terminal block that is to be provided on a housing of a device that is to be mounted on a vehicle, the terminal block comprising:

- a seating that is to be fixed to the housing so as to close an opening of the housing;
- a tubular fitting that is formed on a front surface of the seating and is to be fitted to a mating connector; and
- a ring-shaped seal that is provided on a back surface of the seating, wherein:
  - in a state where the terminal block is attached to the housing, the seal is compressed by being sandwiched between the housing and the seating at a position where the seal surrounds the opening, the seating is provided with a plurality of ribs that stand on a front surface side that is opposite to a side on which the seal is provided, and a plurality of recesses that are spaces surrounded by the plurality of ribs, the plurality of recesses are provided with drainage holes that are located outside the seal, and the plurality of ribs include outer peripheral ribs that are located outside the tubular fitting and form an outer periphery of the seating, and the drainage holes of some recesses of the plurality of recesses are formed in the outer peripheral ribs.

2. The terminal block according to claim 1, wherein bottoms of the recesses, for which the outer peripheral ribs have the drainage holes, overlap the seal.

3. The terminal block according to claim 2, wherein:

the plurality of recesses include first recesses that have bottoms that overlap the seal and have the drainage holes in the outer peripheral ribs, and second recesses that have bottoms outside the seal, and the drainage holes of the second recesses are formed in the bottoms of the second recesses.

4. The terminal block according to claim 1, wherein:

the plurality of recesses include first recesses that overlap the seal and have the outer peripheral ribs, and second recesses that do not overlap the seal and have the outer peripheral ribs, the first recesses have drainage holes in the outer peripheral ribs of the first recesses, the second recesses do not have drainage holes in the outer peripheral ribs of the second, recesses, and bottoms of the second recesses have drainage holes.

5. The terminal block according to claim 1, wherein the seating is formed of a synthetic resin material.

6. The terminal block according to claim 1, wherein the drainage holes are respectively provided in the plurality of recesses of the seating.

* * * * *